Dec. 31, 1946.     S. D. RUSSELL     2,413,522
BALING MEANS
Filed July 26, 1943

INVENTOR
Stanley D. Russell
BY
Emerson B. Donnell
ATTORNEY.

Patented Dec. 31, 1946

2,413,522

UNITED STATES PATENT OFFICE 2,413,522

BALING MEANS

Stanley D. Russell, Racine, Wis., assignor to J. I. Case Company, Racine, Wis., a corporation Application July 26, 1943, Serial No. 496,138

2 Claims. (Cl. 100—19)

The present invention relates to baling and more particularly to baling fibrous material such as hay, straw and the like and an object of the invention is to generally improve the methods and apparatus for performing this work. In baling hay and other forage crops, weather conditions and other factors at times make it virtually impossible to bale the material when it has the proper moisture content. Under these conditions there is always the temptation to bale the material when it is too damp. If this is done, the chances are that the bales will spoil, particularly in the center due to molding caused by the excess moisture and lack of access of air to the interior of the bales. If ventilation of the interior of the bale could be provided, this excess moisture could be dissipated after the bale was formed and stored away from the weather. Thus the material could be successfully baled with a higher moisture content than has heretofore been feasible. The material then could "cure" at least in part in the bale and it would be possible to successfully make hay under conditions of excessive humidity which might prevent the operation with known expedients. Also other uses for an opening in baled material might present themselves and therefore the principal object of the invention is to provide suitable mechanism for producing a passageway in baled material.

Further objects are to provide a simple and inexpensive expedient for achieving this object; such an expedient which is applicable to known baling mechanisms and such an expedient which will require a minimum of alteration when the device is supplied as original equipment or as an attachment for balers already built.

The manner in which these objects are accomplished is shown in the accompanying drawing in which a satisfactory embodiment of the invention is shown. However, it is to be understood that the invention is not limited to the details disclosed but includes all such variations and modifications as fall within the spirit of the invention as herein expressed.

In the drawing

Figure 1:
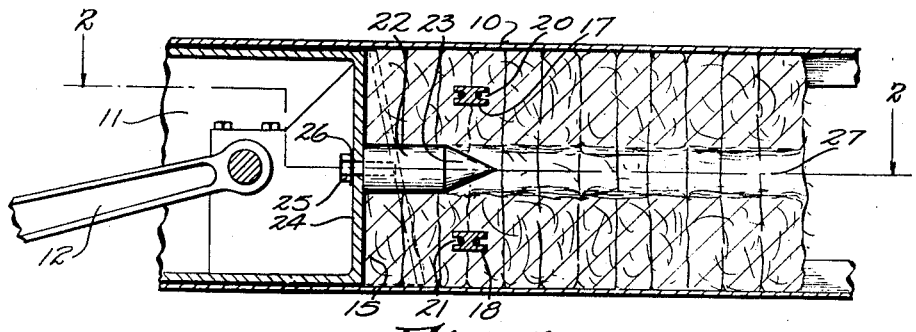
Figure 1 represents a vertical axial sectional view of so much of a baling machine as necessary to illustrate the invention.

As seen in Fig. 1 the baling machine has a bale case or chamber generally designated as 10 which may be of any suitable or well-known type in which is reciprocable a plunger 11, the plunger being moved back and forth in chamber 10 by means of a pitman 12 connected with suitable or well-known mechanism not shown and forming no part of the present invention. Bale chamber 10 in the present instance has a feed opening 13, Fig. 2, in one side thereof and toward which extends a movable apron 14 which conveys fibrous material in well-known manner toward opening 13. Plunger 11 is shown blocking opening 13 but periodically moves to the dotted position shown clear of the feed opening so that material moving with apron 14 toward opening 13 is projected into baling chamber 10. The return stroke of plunger 11 compresses this material in chamber 10 in well-known manner, again momentarily blocking opening 13. Toward the end of the compressing stroke, a knife 15 on plunger 11 cooperates with a cutting block or shear plate 16 on chamber 10 to cut off the material caught in opening 13 by advance of plunger 11.

Repetition of this action, as is shown in Fig. 1, results in a series of separate bodies of fibrous material being compressed against each other into a virtually continuous body of baled material, the separate parts or "feeds" remaining to a certain extent independent because of the cutting action of knife 15.

In the baler shown, this body of baled material is separated from time to time by fingers or slotters 17 and 18 inserted into chamber 10 at intervals in well-known manner so as to be caught and baled into the compressed material. Slotters 17 and 18 move with the baled material to an open portion 10ª of baling chamber 10 whereupon wires as 19 are passed through grooves 20 and 21 in the slotters and fastened around the bales in well-known manner not necessary to further describe.

The construction and operation of the machine as so far described is shown and described in detail in applicant's co-pending patent No. 2,362,861, issued November 14, 1944, for Baler.

Figure 3:
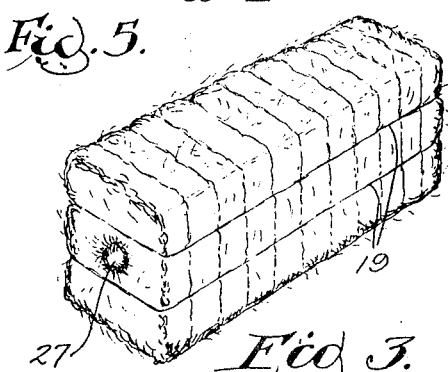
Fig. 3 is a perspective view of a bale made with the mechanism disclosed.

In the present instance in order to form the above mentioned ventilating openings, a punch 22 preferably although not necessarily provided with a reduced end portion 23 is provided and fixed with a head portion 24 of plunger 11 by any suitable means such for example as a screw 26 extending through head 24 and engaged within punch 22, a washer 26 being interposed if desired. Punch 22 is conveniently made round although other shapes might be considered as within the scope of the invention. Punch 22 also is preferably made somewhat longer than the thickness of a single "feed" of fibrous material. The punch forms an opening through each feed as it is compressed into the bale, the openings registering with each other so as to form a continuous passageway 27 through the baled material and which will be open to the atmosphere at either end of each individual bale as clearly shown in Fig. 3. By having punch 22 long enough to penetrate at least part way through a previous feed, the punch operates to insure a complete registration of the several holes and a clean passageway in the resulting bale.

It is to be noted that, owing to the spacing between slotters 17 and 18, punch 22 may extend as far as desired without contacting or interfering with the slotters, and it is also noted that a plurality of punches as 22, are contemplated where desirable, as within the scope of the invention.

Figure 2:
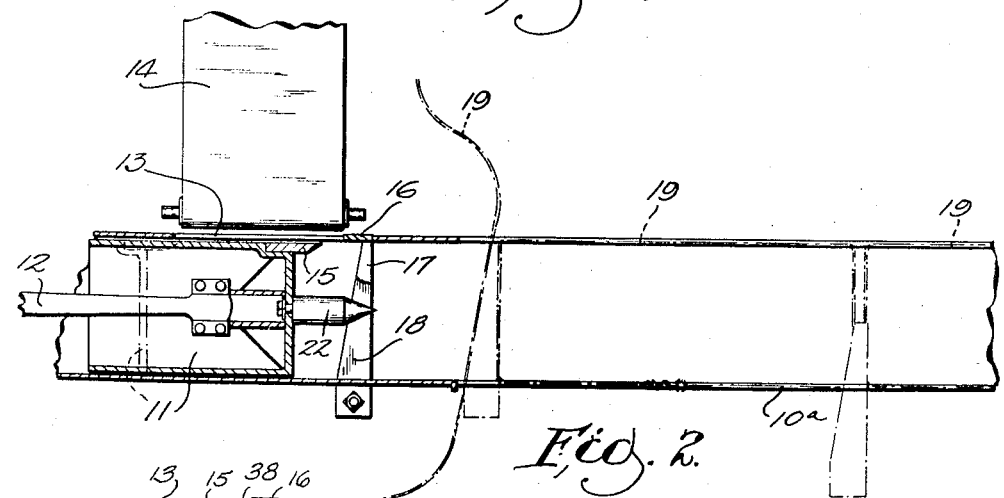
Fig. 2 is a horizontal sectional view taken substantially on the line 2—2 of Fig. 1.
Figure 4:
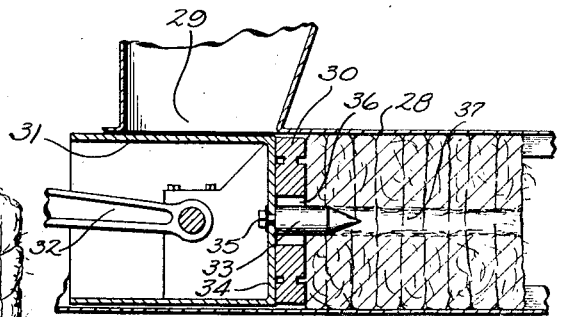
Fig. 4 is a view similar to Fig. 1 showing a modified application of the invention.

The invention is not considered as limited to use with the type of balers shown in Figs. 1 and 2, but may also be used with older type balers utilizing conventional baling blocks for separating the bales. Such a construction is shown in Fig. 4 in which a bailing chamber 28 has a feed opening or hopper 29 through which material and division blocks as 30 are introduced into chamber 28. A plunger 31 is actuated by a pitman 32 and has a punch 33 fixed with a head 34 of the plunger in a manner similar to above mentioned plunger 22 as by a screw 35.

To prevent interference of block 30 with plunger 34, an opening 36 is provided in each block and which is preferably generous enough to provide for free travel of punch 33 even though block 30 may vary somewhat from its usual or intended position. The operation of punch 33 is substantially identical with that of punch 22 above described, the resulting bales having a passageway 37 therethrough which provides for ventilation of the interior in the manner above described, or for other purposes.

Figure 5:
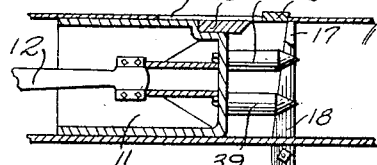
Fig. 5 is a view similar to Fig. 2, showing a further modified construction.

The modification of Fig. 5 is preferably identical with the structure of Fig. 2, except for the provision of a plurality of punches 38 and 39, and therefore the same reference characters have been applied to the parts corresponding to Fig. 2. This arrangement is of utility under circumstances such that a single opening in the bale is deemed insufficient.

The above being a complete description of typical working embodiments of the invention, what is claimed as new and desired to be secured by Letters Patent of the United States is:

1. In a baler, the combination of a baling chamber, a plunger therein, means for feeding material to be baled into the chamber for compression by said plunger, spaced slotters adapted to be inserted at intervals into the chamber for separating the resulting bales and a punch rigidly mounted on said plunger positioned to penetrate the material being baled at a position between said spaced slotters, said punch projecting at all times from the face of said plunger and being of a length to pass entirely through one feed of material, and to penetrate at least partway through a previous feed whereby repeated strokes of said plunger and punch result in a continuous opening through each bale and which opening remains when the bale is removed from the machine.

2. In a baler, the combination of a baling chamber, a plunger therein, means for feeding material to be baled into the chamber for compression by said plunger, spaced slotters adapted to be inserted at intervals into the chamber for separating the resulting bales and a plurality of punches rigidly mounted on said plunger positioned to penetrate the material being baled at positions spaced from said slotters, said punches projecting at all times from the face of said plunger and being of a length to pass entirely through one feed of material, and to penetrate at least partway through the previous feed whereby repeated strokes of said plunger and punches result in continuous openings through each bale and which openings remain when the bale is removed from the machine.

STANLEY D. RUSSELL.